(12) United States Patent
Kuriyagawa

(10) Patent No.: US 9,122,057 B2
(45) Date of Patent: Sep. 1, 2015

(54) DISPLAY DEVICE AND METHOD OF MANUFACTURING THE DISPLAY DEVICE

(75) Inventor: Takeshi Kuriyagawa, Mobara (JP)

(73) Assignee: Pixtronix, Inc., San Diego, CA (US)

( * ) Notice: Subject to any disclaimer, the term of this patent is extended or adjusted under 35 U.S.C. 154(b) by 255 days.

(21) Appl. No.: 13/483,125

(22) Filed: May 30, 2012

(65) Prior Publication Data

US 2012/0307335 A1    Dec. 6, 2012

(30) Foreign Application Priority Data

Jun. 3, 2011    (JP) .................................. 2011-125432

(51) Int. Cl.
*G02B 26/02*    (2006.01)

(52) U.S. Cl.
CPC .................................... *G02B 26/023* (2013.01)

(58) Field of Classification Search
CPC ........ G02B 7/02; G02B 26/023; G02B 26/02; G09G 2300/0842; G09G 2300/0861; G09G 2310/0235
USPC ...................................... 359/230; 345/55, 76
See application file for complete search history.

(56) References Cited

U.S. PATENT DOCUMENTS

| 7,781,850 | B2 | 8/2010 | Miles et al. | |
|---|---|---|---|---|
| 2006/0091860 | A1 | 5/2006 | Nakamiya et al. | |
| 2006/0250325 | A1* | 11/2006 | Hagood et al. | ................... 345/55 |
| 2009/0067034 | A1 | 3/2009 | Woo et al. | |
| 2011/0122474 | A1 | 5/2011 | Payne et al. | |

FOREIGN PATENT DOCUMENTS

| JP | 2003021798 A | 1/2003 |
|---|---|---|
| JP | 2006098990 A | 4/2006 |
| JP | 2008-197668 | 8/2008 |
| JP | 2010181495 A | 8/2010 |
| WO | 2006036435 A1 | 4/2006 |
| WO | 2006091860 A2 | 8/2006 |
| WO | WO 2006/091738 A1 | 8/2006 |
| WO | 2010062616 | 6/2010 |

OTHER PUBLICATIONS

Taiwan Search Report—TW101119661—TIPO—Sep. 11, 2014.
European Search Report—EP12169401—Search Authority—The Berlin—Mar. 20, 2015.

* cited by examiner

*Primary Examiner* — Euncha Cherry
(74) *Attorney, Agent, or Firm* — Edward A. Gordon; Foley & Lardner LLP

(57) ABSTRACT

A display device according to the present invention includes a plurality of pixels provided on a substrate; a first insulating film provided on the substrate; a second insulating film provided on the first insulating film in contact with at least a part thereof and formed of a different material from that of the first insulating film; a plurality of MEMS shutters provided on the second insulating film respectively in correspondence with the plurality of pixels, the plurality of MEMS shutters having a third insulating film formed on side surfaces thereof; and a plurality of terminals for supplying a potential to the plurality of gate lines and the plurality of data lines, the plurality of terminals receiving the potential through openings formed in the first insulating film and the second insulating film, the openings being formed on the plurality of terminals.

11 Claims, 13 Drawing Sheets

(a)

(b)

(a)

(b)

(c)

(d)

(e)

(a)

(b)

(c)

(d)

(a)

(b)

(c)

(d)

(e)

DISPLAY DEVICE AND METHOD OF MANUFACTURING THE DISPLAY DEVICE

CROSS-REFERENCE TO RELATED APPLICATIONS

This application is based upon and claims the benefit of priority from the prior Japanese Patent Application No. 2011-125432, filed on 3 Jun., 2011, the entire contents of which are incorporated herein by reference.

FIELD

The present invention relates to a display device using a mechanical shutter and a method for producing the same.

BACKGROUND

Recently, a display device using a mechanical shutter to which a MEMS (Micro Electronic Mechanical Systems) technology is applied (hereinafter, such a shutter will be referred to as a "MEMS shutter") has been a target of attention. Such a display device (hereinafter, referred to as a "MEMS display device") opens or closes a MEMS shutter provided in correspondence with each of pixels, at a high speed by use of a TFT, to control the amount of light to be transmitted through the shutter, and thus adjusts the brightness of an image (see, for example, Japanese Laid-Open Patent Publication No. 2008-197668). A mainstream gray scale system of such MEMS display devices is a time-ratio gray scale system of displaying an image by sequentially switching light provided from one of LED backlight units of red, green and blue to light provided from another of the LED backlight units. Accordingly, the MEMS display devices have features that polarizing films or color filters used for a liquid crystal display device are not required; and as compared with a liquid crystal display device, the utilization factor of backlight is about 10 times higher, the power consumption is no more than half, and the color reproducibility is superior.

A MEMS display device is formed as follows. A TFT including switching elements for driving MEMS shutters, and gate and data drivers for driving the switching elements is formed on a substrate. Terminals for supplying signals from an external device to the TFT are also formed on the substrate. Usually for forming a MEMS display device, on the TFT substrate having the TFTs and the terminals formed thereon, a passivation film (insulating film) for covering the TFTs and the terminals is formed, and MEMS shutters are formed on the passivation film. An insulating film is formed to cover the MEMS shutters except for a part of each MEMS shutter which is to be electrically connected to a terminal. A movable section of the MEMS shutter has a hollow structure. Therefore, the insulating film is formed by CVD (Chemical Vapor Deposition) or the like on the entirety of a surface of the TFT substrate having the MEMS shutters formed thereon, so that a side surface and a bottom surface of the movable section is covered with the insulating film. Then, a counter substrate is joined to the TFT substrate. The terminals formed on the TFT substrate need to be supplied with signals from an external device. Therefore, the TFT substrate and the counter substrate are joined together such that the counter substrate does not cover a top surface of each terminal.

In order to supply signals and electric power to the terminals formed on the TFT substrate from an external device, the insulating film on the terminals needs to be removed to expose the terminals. The insulating film can be removed by, for example, a combination of a photolithography process and an etching process. However, the insulating film provided as the passivation film (lower-layer insulating film) and the insulating film provided on the lower-layer insulating film for covering the MEMS shutter (the insulating film provided on the lower-layer insulating film will be referred to as the upper-layer insulating film) are often both formed of a nitride film, which has splendid properties as a covering film and as an insulating film. Therefore, it is difficult to perform etching such that only the upper-layer insulating film is removed and the lower-layer insulating film is left having a sufficient thickness. When etching proceeds to the lower-layer insulating film, lines formed on the TFT substrate may be exposed, which may undesirably cause insulation failure or continuity failure.

The present invention made in light of the above-described problems has an object of providing a display device and a method for producing the same for removing an insulating film from top of terminals while suppressing the thickness reduction of an insulating film provided for protecting a surface of a TFT substrate and thus improving the reliability of the TFT substrate.

SUMMARY

According to an embodiment of the present invention, a display device including a plurality of pixels respectively provided in correspondence with intersections of a plurality of data lines and a plurality of gate lines provided on a substrate; a first insulating film provided on the substrate; a second insulating film provided on the first insulating film in contact with at least a part thereof and formed of a different material from that of the first insulating film; a plurality of MEMS shutters provided on the second insulating film, respectively in correspondence with the plurality of pixels, the plurality of MEMS shutters having a third insulating film formed on side surfaces thereof; and a plurality of terminals for supplying a potential to the plurality of gate lines and the plurality of data lines, the plurality of terminals receiving the potential through openings formed in the first insulating film and the second insulating film, the openings being formed on the plurality of terminals is provided.

The second insulating film may have an etching rate different from that of the first insulating film and different from that of the third insulating film.

The MEMS shutters may each include a shutter having an opening, a first spring connected to the shutter, a first anchor connected to the first spring, a second spring, and a second anchor connected to the second spring; and the first spring and the second spring may be electrostatically driven by a potential difference between the first anchor and the second anchor.

The MEMS shutters may each be connected to one of switching elements respectively provided in correspondence with the MEMS shutters; and the potential difference between the first anchor and the second anchor may be provided by the switching element.

The display device may further include a counter substrate joined to the substrate, the counter substrate having light-transmissive sections; and a backlight unit provided to face the counter substrate. Light from the backlight unit may be transmitted through the opening of each of the shutters and each of the light-transmissive sections which overlaps the opening.

According to an embodiment of the present invention, a method for producing a display device including forming a plurality of switching elements and a plurality of terminals on a substrate; forming a first insulating film on the plurality of switching elements and the plurality of terminals; etching away parts of the first insulating film which are on the plurality of terminals, thereby exposing parts of the plurality of terminals; forming a second insulating film on the first insulating film, the second insulating film being formed of a different material from that of the first insulating film; etching away parts of the second insulating film which are on the plurality of terminals, thereby exposing parts of the plurality of terminals; forming a plurality of MEMS shutters on the second insulating film, each of the plurality of MEMS shutters being drivable by a corresponding switching element among the plurality of switching elements and including a shutter having an opening, a first spring connected to the shutter, a first anchor connected to the first spring, a second spring, and a second anchor connected to the second spring; forming a third insulating film on the plurality of MEMS shutters and the plurality of terminals; and etching away parts of the third insulating film which are on the plurality of terminals, thereby exposing parts of the plurality of terminals is provided.

According to an embodiment of the present invention, a method for producing a display device including forming a plurality of switching elements and a plurality of terminals on a substrate; forming a first insulating film on the plurality of switching elements and the plurality of terminals; forming a second insulating film on the first insulating film, the second insulating film being formed of a different material from that of the first insulating film; etching away parts of the first insulating film and parts of the second insulating film which are on the plurality of terminals, thereby exposing parts of the plurality of terminals; forming a plurality of MEMS shutters on the second insulating film, each of the plurality of MEMS shutters being drivable by a corresponding switching element among the plurality of switching elements and including a shutter having an opening, a first spring connected to the shutter, a first anchor connected to the first spring, a second spring, and a second anchor connected to the second spring; forming a third insulating film on the plurality of MEMS shutters and the plurality of terminals; and etching away parts of the third insulating film which are on the plurality of terminals, thereby exposing parts of the plurality of terminals is provided.

According to an embodiment of the present invention, a method for producing a display device including forming a plurality of switching elements and a plurality of terminals on a substrate; forming a first insulating film on the plurality of switching elements and the plurality of terminals; etching away parts of the first insulating film which are on the plurality of terminals, thereby exposing parts of the plurality of terminals; forming a second insulating film on the first insulating film, the second insulating film being formed of a different material from that of the first insulating film; forming a plurality of MEMS shutters on the second insulating film, each of the plurality of MEMS shutters being drivable by a corresponding switching element among the plurality of switching elements and including a shutter having an opening, a first spring connected to the shutter, a first anchor connected to the first spring, a second spring, and a second anchor connected to the second spring; forming a third insulating film on the plurality of MEMS shutters and the plurality of terminals; and etching away parts of the second insulating film and parts of the third insulating film which are on the plurality of terminals, thereby exposing parts of the plurality of terminals is provided.

The second insulating film may be formed of a material having a different etching rate from that of the first insulating film and different from that of the third insulating film.

The second insulating film may be formed to have a stacking structure including a plurality of layers.

The first insulating film and the third insulating film may be formed of silicon nitride by CVD.

The counter substrate may be joined to the substrate via a sealing material such that the counter substrate faces a surface of the substrate having the plurality of switching elements formed thereon.

BRIEF DESCRIPTION OF DRAWINGS

FIG. 1(a) is an isometric view of the display device, and FIG. 1(b) is a plan view thereof;

FIG. 6(a) is a cross-sectional view showing a step of forming a first insulating film, FIG. 6(b) is a cross-sectional view showing a step of forming a second insulating film, FIG. 6(c) is a cross-sectional view showing a step of joining a counter substrate to a substrate, and FIG. 6(d) is a cross-sectional view showing a step of forming a terminal opening;

FIG. 7(a) is a cross-sectional view showing a step of forming the second insulating film, and FIG. 7(b) is a cross-sectional view showing a step of forming the terminal opening;

FIG. 9(a) is a cross-sectional view showing a step of forming a first insulating film and a second insulating film, FIG. 9(b) is a cross-sectional view showing a step of forming a part corresponding to an opening on a terminal, FIG. 9(c) is a cross-sectional view showing a step of forming a third insulating film, FIG. 9(d) is a cross-sectional view showing a step of joining a counter substrate to a substrate, and FIG. 9(e) is a cross-sectional view showing a step of forming the opening on the terminal;

FIG. 11(a) is a cross-sectional view showing a step of forming a first insulating film and a second insulating film, FIG. 11(b) is a cross-sectional view showing a step of forming a part corresponding to the opening on the terminal, FIG. 11(c) is a cross-sectional view showing a step of forming a third insulating film, FIG. 11(d) is a cross-sectional view showing a step of joining the counter substrate to the substrate, and FIG. 11(e) is a cross-sectional view showing a step of forming the opening on the terminal;

FIG. 12(a) is a cross-sectional view showing a step of forming a first insulating film and a second insulating film, FIG. 12(b) is a cross-sectional view showing a step of forming a third insulating film, FIG. 12(c) is a cross-sectional view showing a step of joining the counter substrate to the substrate, and FIG. 12(d) is a cross-sectional view showing a step of forming the opening on the terminal; FIG. 13(a) is a cross-sectional view showing a step of forming a first insulating film and a lower-layer second insulating film, FIG. 13(b) is a cross-sectional view showing a step of forming an upper-layer second insulating film, FIG. 13(c) is a cross-sectional view showing a step of forming a third insulating film, FIG. 13(d) is a cross-sectional view showing a step of joining the counter substrate to the substrate, and FIG. 13(e) is a cross-sectional view showing a step of forming the opening on the terminal.

DESCRIPTION OF EMBODIMENTS

Figure 1:
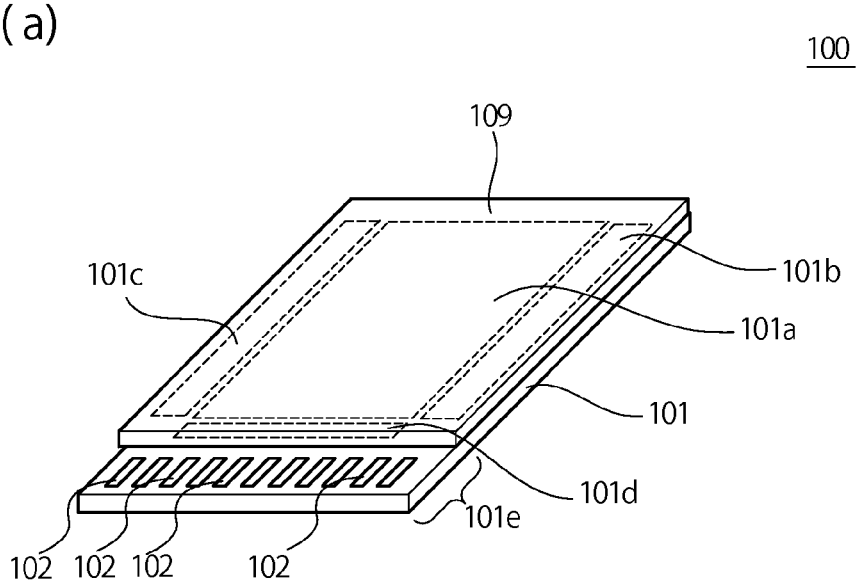
FIG. 1 shows a display device in an embodiment according to the present invention.
Figure 1:
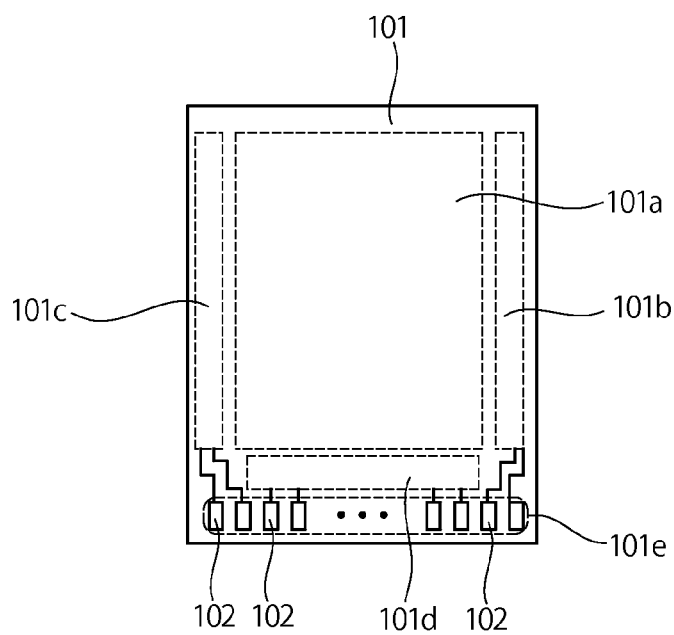

Hereinafter, embodiments of the present invention will be described with reference to the drawings. A display device according to the present invention is not limited to those of the following embodiments and may be modified in any of various manners.

FIGS. 1(a) and (b) show a display device 100 in an embodiment according to the present invention. FIG. 1(a) is an isometric view of the display device 100, and FIG. 1(b) is a plan view thereof. The display device 100 in this embodiment includes a substrate 101 and a counter substrate 109. The substrate 101 includes a display section 101a, driving circuits 101b, 101c and 101d, and a terminal section 101e. The substrate 101 and the counter substrate 109 are joined together by use of a sealing material or the like.

Figure 2:
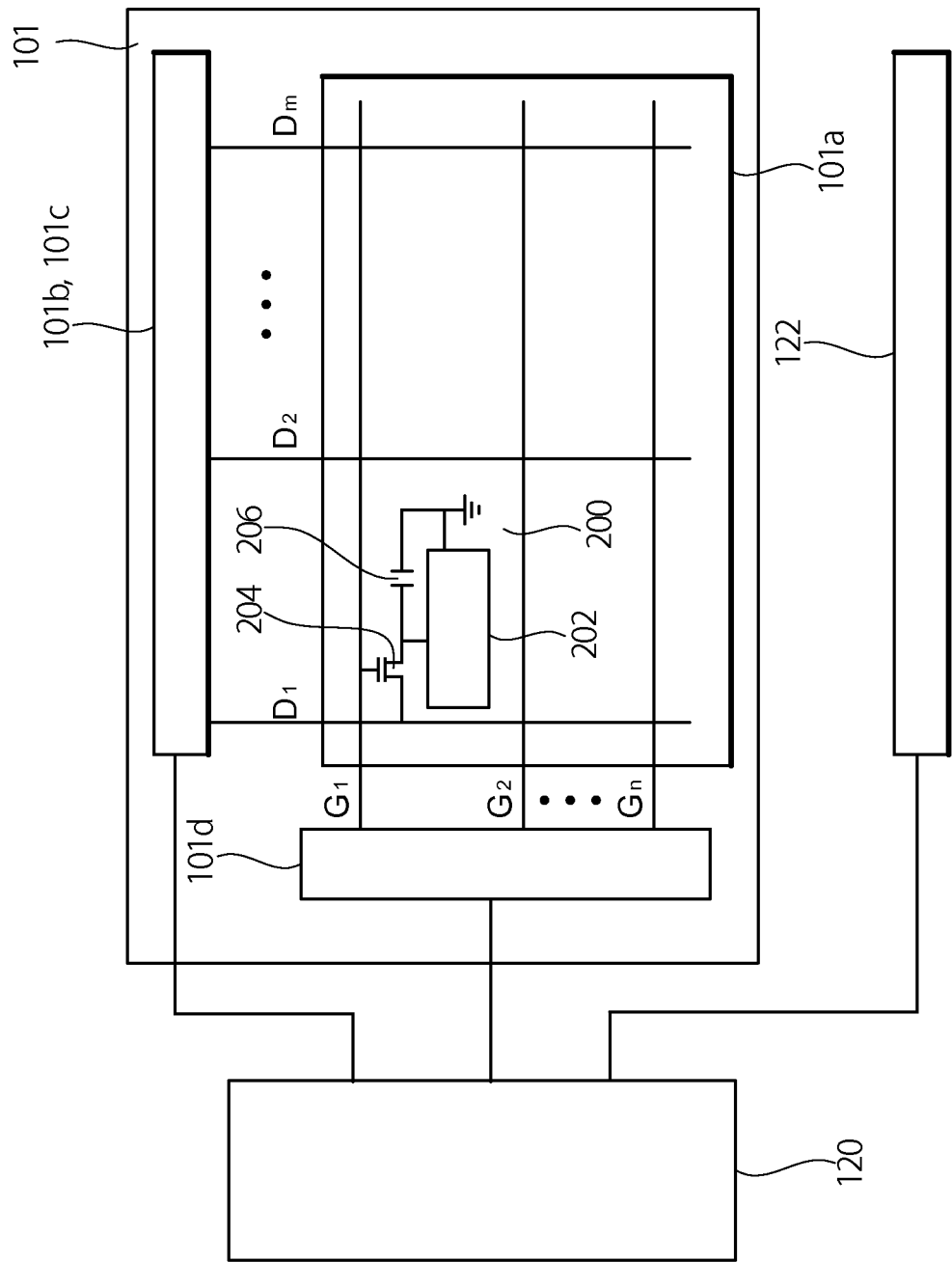
FIG. 2 is a circuit block diagram of the display device in an embodiment according to the present invention.

FIG. 2 is a block diagram of the display device 100 in an embodiment according to the present invention. The display device 100 in an embodiment according to the present invention shown in FIG. 2 is supplied with an image signal and a control signal from a controller 120. The display device 100 in an embodiment according to the present invention shown in FIG. 2 is also supplied with light from a backlight unit 122 controlled by the controller 120. The display device 100 may be structured to include the controller 120 and the backlight unit 122.

As shown in FIG. 2, the display section 101a includes a plurality of pixels 200 arranged in a matrix and respectively provided in correspondence with intersections of gate lines (G1, G2, . . . , Gn) and data lines (D1, D2, . . . , Dm). Each of the pixels 200 includes a mechanical shutter (MEMS shutter) 202, a switching element 204, and a storage capacitance 206. The driving circuits 101b and 101c are data drivers, and supply data signals to the switching elements 204 via the data lines (D1, D2, . . . , Dm). The driving circuit 101d is a gate driver and supplies gate signals to the switching elements 204 via the gate lines (G1, G2, . . . , Gn). In this embodiment, as shown in FIG. 1, the driving circuits 101b and 101c as the data drivers are provided to have the display section 101a therebetween, but the arrangement of the driving circuits 101b and 101c is not limited to this. Each switching element 204 drives the corresponding MEMS shutter 202 based on the data signal supplied from the corresponding data line among the data lines (D1, D2, . . . , Dm).

Figure 3:
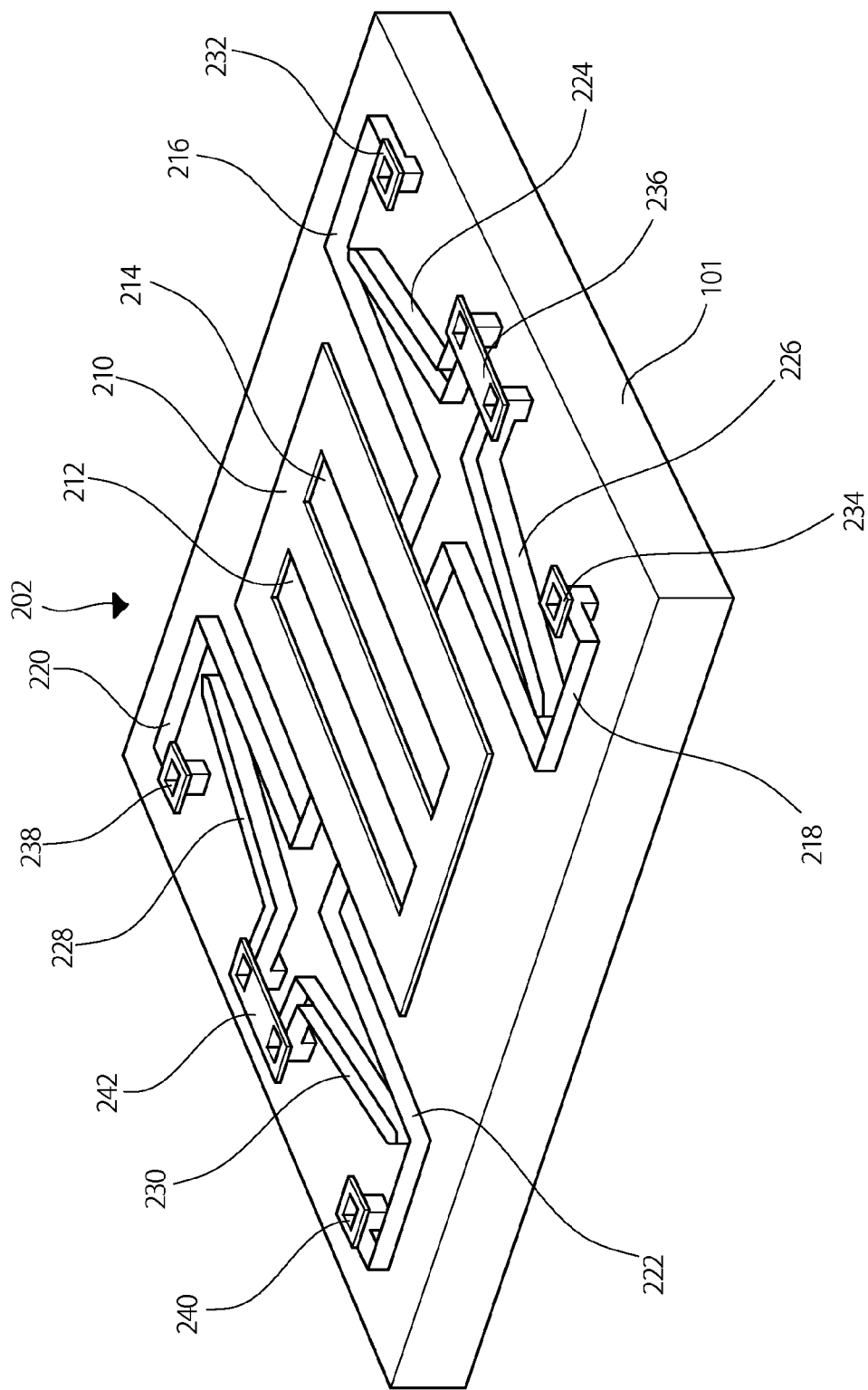
FIG. 3 shows a structure of a MEMS shutter usable for the display device in an embodiment according to the present invention.
Figure 4:
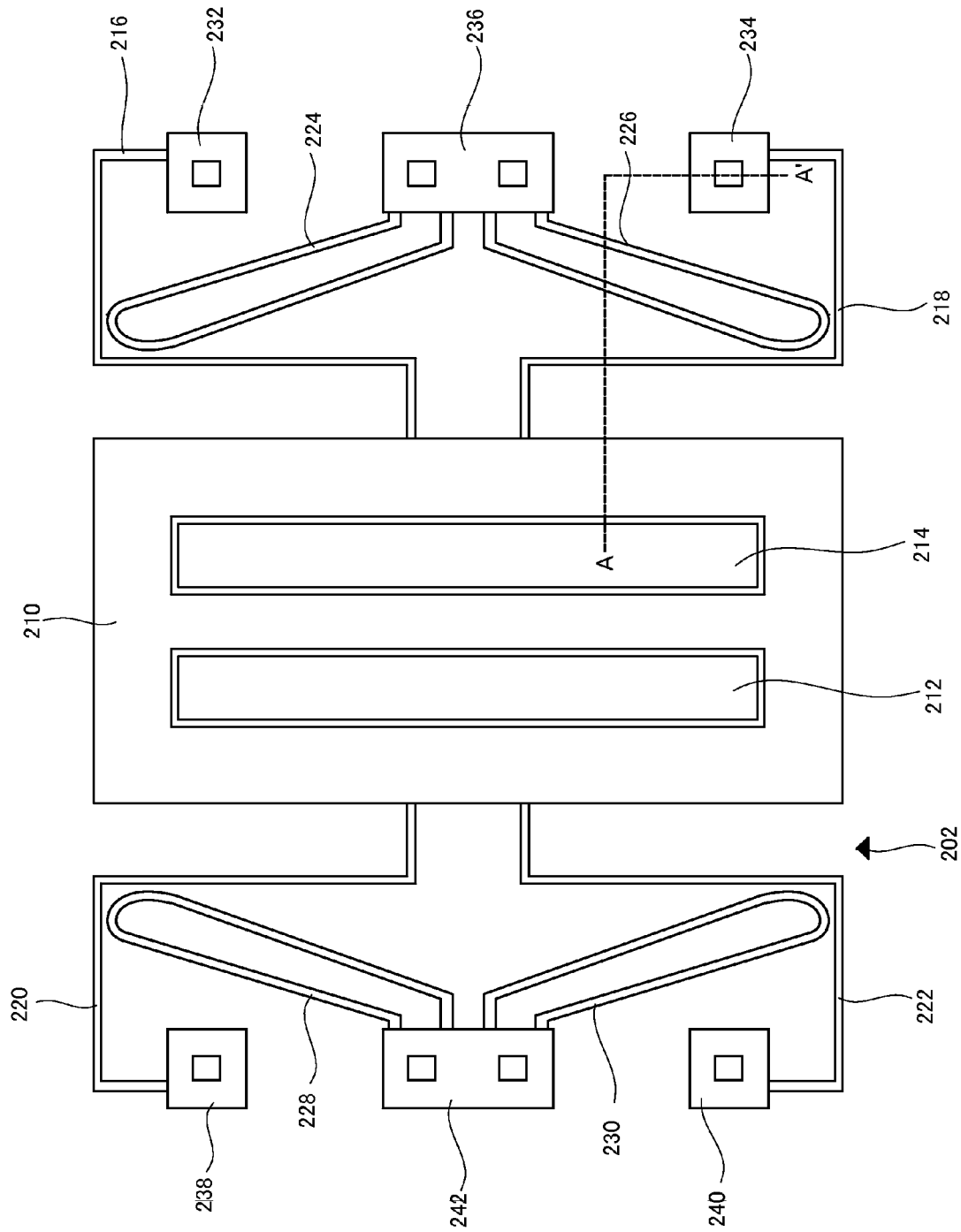
FIG. 4 shows a structure of the MEMS shutter usable for the display device in an embodiment according to the present invention.

Now, with reference to FIG. 3 and FIG. 4, a structure of the MEMS shutter 202 will be described. FIG. 3 shows a structure of the MEMS shutter 202 usable for the display device 100 in an embodiment according to the present invention. FIG. 4 shows a structure of the MEMS shutter 202 usable for the display device 100 in an embodiment according to the present invention. FIG. 3 shows one MEMS shutter 202 for the convenience of description, but the display device 100 in an embodiment according to the present invention includes a plurality of MEMS shutters 202 shown in FIG. 3 arranged in a matrix on the substrate 101.

The MEMS shutter 202 includes a shutter 210, first springs 216, 218, 220 and 222, second springs 224, 226, 228 and 230, and anchor sections 232, 234, 236, 238, 240 and 242. The shutter 210 has openings 212 and 214, and a main body of the shutter 210 acts as a light blocking section. Although not shown, the counter substrate 109 has light-transmissive sections for transmitting light. The counter substrate 109 is joined to the substrate 101 via a sealing material or the like such that the openings 212 and 214 of the shutter 210 and each light-transmissive section of the counter substrate 109 generally overlap each other in a planar direction. The display device 100 is structured such that light supplied from behind the counter substrate 109 and transmitted through the light-transmissive section of the counter substrate 109 is transmitted through the openings 212 and 214 of the shutter 210 and thus is visually recognized by the human eye. The MEMS shutter 202 in this embodiment is merely an example of MEMS shutter usable for the display device 100 according to the present invention. The MEMS shutter usable for the display device according to the present invention is not limited to having the structure shown in FIGS. 3 and 4, but may be any MEMS shutter which can be driven by a switching element.

One side of the shutter 210 is connected to the anchor sections 232 and 234 via the first springs 216 and 218. The anchor sections 232 and 234 have a function of supporting the shutter 210 such that shutter 210 floats above a surface of the substrate 101 together with the first springs 216 and 218. The anchor section 232 is electrically connected to the first spring 216, and the anchor section 234 is electrically connected to the first spring 218. The anchor section 232 and 234 are each supplied with a bias potential from the switching element 204, and thus the first springs 216 and 218 are each supplied with the bias potential. The second springs 224 and 226 are electrically connected to the anchor section 236. The anchor section 236 has a function of supporting the second springs 224 and 226 such that the second springs 224 and 226 float above the surface of the substrate 101. The anchor section 236 is supplied with a ground potential, and thus the second springs 224 and 226 are each supplied with the ground potential. The anchor section 236 may be supplied with a predetermined potential instead of the ground potential (this is also applicable to the following description regarding the ground potential).

The other side of the shutter 210 is connected to the anchor sections 238 and 240 via the first springs 220 and 222. The anchor sections 238 and 240 have a function of supporting the shutter 210 such that shutter 210 floats above the surface of the substrate 101 together with the first springs 220 and 222. The anchor section 238 is electrically connected to the first spring 220, and the anchor section 240 is electrically connected to the first spring 222. The anchor section 238 and 240 are each supplied with a bias potential from the switching element 204, and thus the first springs 220 and 222 are each supplied with the bias potential. The second springs 228 and 230 are electrically connected to the anchor section 242. The anchor section 242 has a function of supporting the second springs 228 and 230 such that the second springs 228 and 230 float above the surface of the substrate 101. The anchor section 242 is electrically connected to the second springs 228 and 230. The anchor section 242 is supplied with a ground potential, and thus the second springs 228 and 230 are each supplied with the ground potential.

As described above, in this embodiment, the anchor sections 232 and 234 are each supplied with a bias potential from the switching element 204, and thus the first springs 216 and 218 are each supplied with the bias potential. Also, the anchor section 236 is supplied with a ground potential, and thus the second springs 224 and 226 are each supplied with the ground potential. By a potential difference of the first springs 216 and 218 from the second springs 224 and 226, the first spring 216 and the second spring 224 are electrostatically driven and moved to be attracted to each other, and the first spring 218 and the second spring 226 are electrostatically driven and moved to be attracted to each other. Thus, the shutter 210 is moved.

Similarly, the anchor sections 238 and 240 are each supplied with a bias potential from the switching element 204, and thus the first springs 220 and 222 are each supplied with the bias potential. Also, the anchor section 242 is supplied with a ground potential, and thus the second springs 228 and 230 are each supplied with the ground potential. By a potential difference of the first springs 220 and 222 from the second springs 228 and 230, the first spring 220 and the second spring 228 are electrostatically driven and moved to be attracted to each other, and the first spring 222 and the second spring 230 are electrostatically driven and moved to be attracted to each other. Thus, the shutter 210 is moved.

In this embodiment, the first springs, the second springs and the anchor sections are provided on both sides of the shutter 210, but the display device 100 according to the present invention is not limited to such a structure. For example, the first springs, the second springs and the anchor sections may be provided on one side of the shutter 210, and only the first springs and the anchor sections may be provided on the other side of the shutter 210. The first springs and the anchor sections provided on the other side of the shutter 210 may have a function of supporting the shutter 210 such that the shutter 210 floats above the substrate 101, and the first springs and the second springs on the one side of the shutter 210 may be electrostatically driven to move the shutter 210.

Now, for explaining how the display device 100 in an embodiment according to the present invention has been conceived, a structure of a display device using a general MEMS shutter will be described with reference to FIG. 5 through FIG. 7.

Hereinafter, with reference to FIG. 5, a structure of a display section and a terminal section of a general display device, as opposed to the display device 100 in an embodiment according to the present invention, will be described. FIG. 5 is a cross-sectional view showing an example of display section and terminal section of a general display device. In FIG. 5, identical elements to those of the above-described display device 100 in an embodiment according to the present invention bear identical reference numerals thereto. For the convenience of description, letter "A" is provided in a top part of FIG. 5 to define an area corresponding to the display section, and letter "B" is provided in a top part of FIG. 5 to define an area corresponding to the terminal section. The area of "A" in FIG. 5 corresponds to a cross-section taken along line A-A' in FIG. 4.

Figure 5:
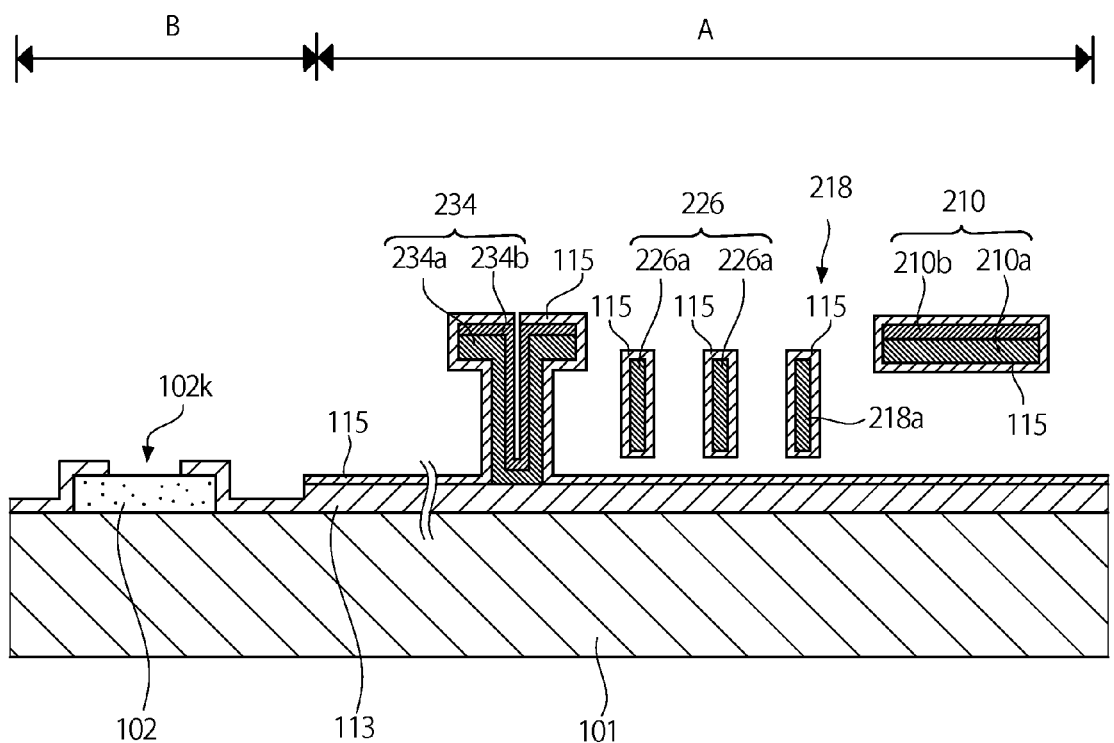
FIG. 5 is a cross-sectional view showing an example of display section and terminal section of a general display device as opposed to the display device in an embodiment according to the present invention.

As shown in FIG. 5, on a substrate 101 having a TFT formed thereon, a first insulating film 113 is formed. Before the first insulating film 113 is formed, the substrate 101 already has gate lines (G1, G2, . . . , Gn), data lines (D1, D2, . . . , Dm), data drivers 101b and 101c, a gate driver 101d, a switching device 204, a terminal 102 and the like formed thereon, and thus forms a TFT substrate. As shown in FIG. 5, in the area A corresponding to the display section, the first insulating film 113 is formed on the substrate 101. In the area B corresponding to the terminal section, the first insulating film 113 is formed on the terminal 101, which is formed on the substrate 101. As the first insulating film 113, a silicon nitride (SiN) film, for example, may be formed by CVD or the like. The silicon nitride (SiN) film may be used because of a good coverage and a high dielectric strength voltage thereof. By use of CVD, a silicon nitride film can be formed on the substrate 101 as the first insulating film 113 at a temperature of about 200° C. A suitable material for the first insulating film 113 is light-transmissive and does not unnecessarily reflect or block light in the display device 100. Therefore, it is preferable that a light-transmissive film is used for the first insulating film 113.

In the area A corresponding to the display section, a shutter 210, a first spring 218, a second spring 226, and an anchor section 234 are formed on the first insulating film 113. As shown in FIG. 5, the shutter 210 may have a stacked body including an a-Si layer (210a) and a light-blocking AlSi layer (210b). The anchor section 234 may have a stacked body including an a-Si layer (234a) and an AlSi layer (234b). The first spring 218 and the second spring 226 may be formed of an a-Si layer (226a). The structures and the materials of the shutter 210, the first spring 218, the second spring 226 and the anchor section 234 are not limited to those described above, and any structure and material may be used as long as the shutter 210, the first spring 218, the second spring 226 and the anchor section 234 are operable as a MEMS shutter 202.

On the substrate 101 having the shutter 210, the first spring 218, the second spring 226 and the anchor section 234 formed thereon, a second insulating film 115 is formed. As shown in FIG. 5, the second insulating film 115 is formed so as to cover side surfaces and bottom surfaces of the shutter 210, the first spring 218, the second spring 226, and the anchor section 234. Owing to this, the shutter 210, the first spring 218 and the second spring 226 each having the a-Si layer are prevented from undetachably contacting other parts of the display device (sticking) or from causing short-circuiting, even if being displaced during the operation of the MEMS shutter 202. Like as the first insulating film 113, as the second insulating film 115, a silicon nitride film, for example, may be formed of by CVD or the like. The silicon nitride film may be used because of a light-transmissiveness, a good coverage and a high dielectric strength voltage thereof. By use of CVD, the second insulating film 115 is formed at a temperature of about 200° C. on the substrate 101 and also on the side surfaces and the bottom surfaces of the shutter 210, the first spring 218 and the second spring 226, which are formed out of contact with the substrate 101. The structure and the material of the second insulating film 115 are not limited to those described above with reference to FIG. 5, and any structure and material may be used as long as the second insulating film 115 has a structure for preventing short-circuiting and allowing the MEMS shutter 202 to be electrostatically driven properly.

The first insulating film 113 and the second insulating film 115 formed on the terminal 102 are removed by etching to expose the terminal 102. As a result, a terminal opening 102k for exposing the terminal 102 (exposed part of the terminal) is formed as shown in FIG. 5.

Hereinafter, with reference to FIG. 6 and FIG. 7, production steps of the terminal section of the general display device, as opposed to the display device 100 according to the present invention, will be described.

Figure 6:
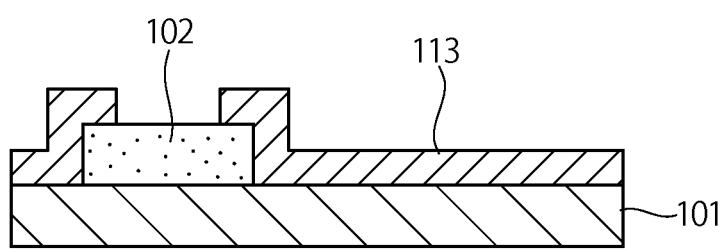
FIG. 6 shows production steps of the terminal section of the general display device as opposed to the display device in an embodiment according to the present invention.
Figure 6:
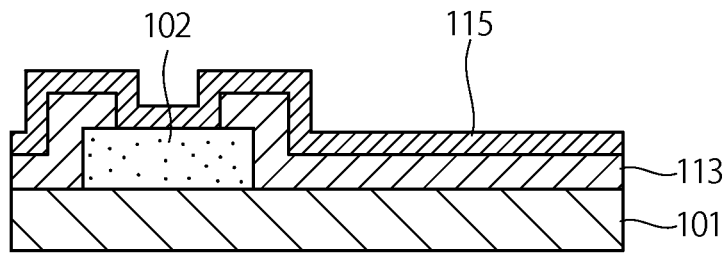
Figure 6:
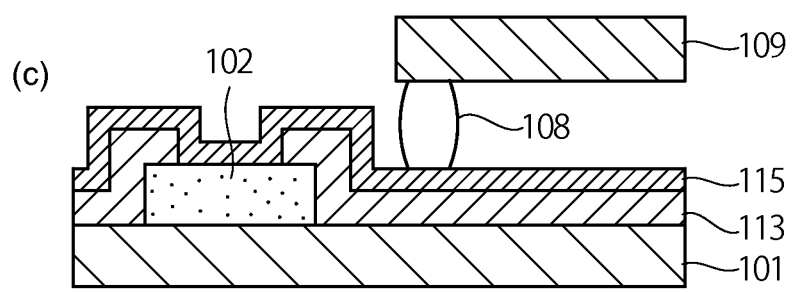
Figure 6:
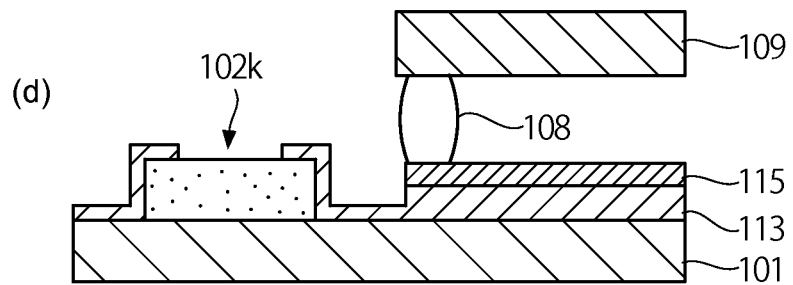
Figure 7:
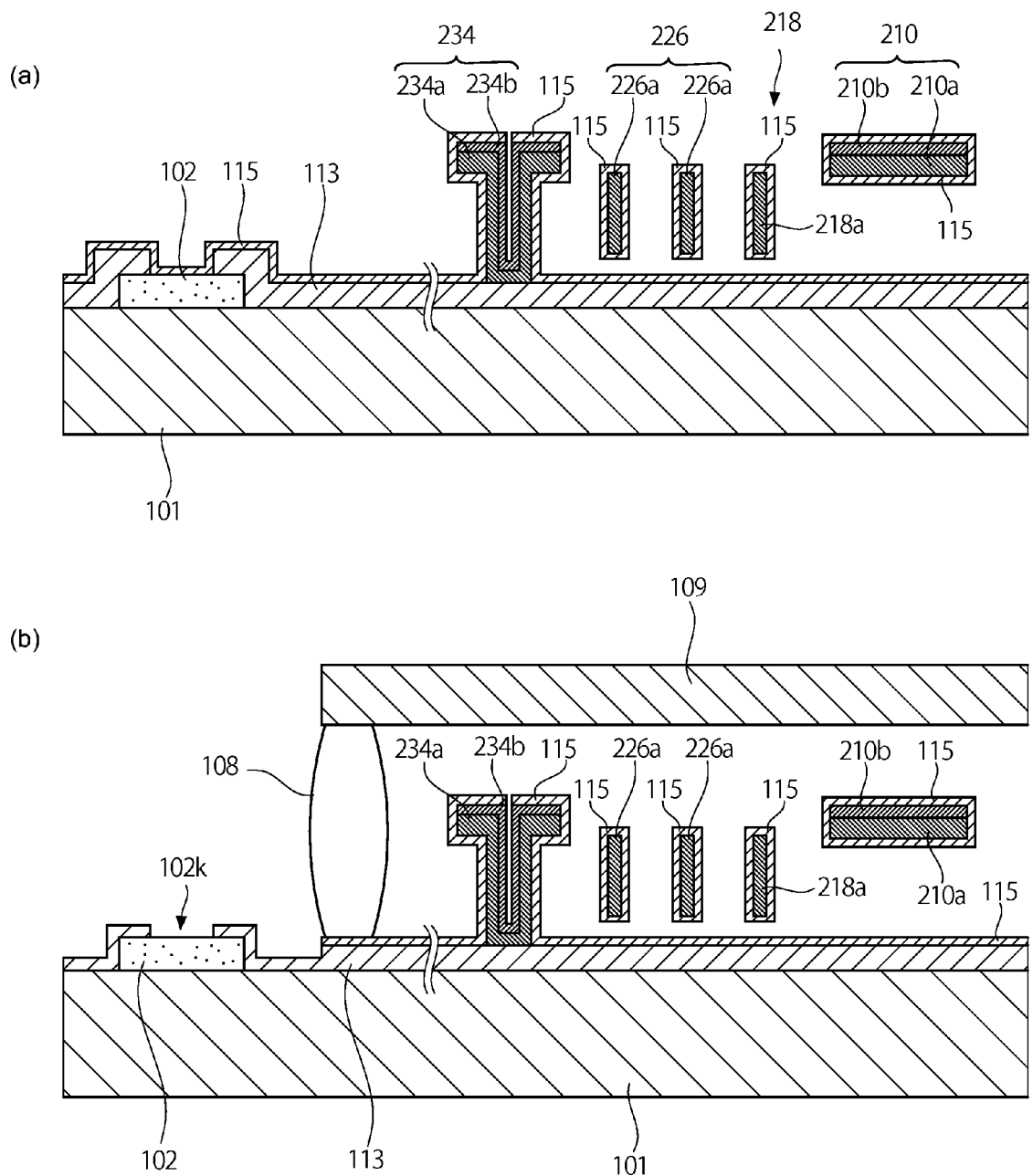
FIG. 7 shows production steps of the display section and the terminal section of the general display device as opposed to the display device in an embodiment according to the present invention.

FIG. 6 shows production steps of the terminal section of the general display device. FIG. 6(a) is a cross-sectional view showing a step of forming the first insulating film 113, FIG. 6(b) is a cross-sectional view showing a step of forming the second insulating film 115, FIG. 6(c) is a cross-sectional view showing a step of joining a counter substrate 109 to the substrate 101, and FIG. 6(d) is a cross-sectional view showing a step of forming the terminal opening 102k. FIG. 7 shows production steps of forming the display section and the terminal section of the general display device. FIG. 7(a) is a cross-sectional view showing a step of forming the second insulating film 115, and FIG. 7(b) is a cross-sectional view showing a step of forming the terminal opening 102k.

First, as shown in FIG. 6(a), on the substrate 101 having the terminal 102 formed thereon, the first insulating film 113 is formed, and a part of the first insulating film 113 corresponding to a part in which the terminal opening 102k is to be formed is removed by etching. As the first insulating film 113, a silicon nitride film may be formed by use of CVD as described above. By forming a silicon nitride film by CVD, the first insulating film 113 can be formed on the substrate 101 at a temperature of about 200° C. For etching the first insulating film 113 formed of the silicon nitride film, dry etching by a RIE method using, for example, a mixed gas of fluorine-containing gas such as $CF_4$ gas, $SF_6$ gas or the like and $O_2$ gas may be applied.

Next, as shown in FIG. 6(b), the second insulating film 115 is formed on the first insulating film 113. Before this step, as shown in FIG. 7(a), the first insulating film 113 has the shutter 210, the first spring 218, the second spring 226 and the anchor section 234 formed thereon. The second insulating film 115 is formed to cover the side surfaces and the bottom surfaces of these elements. Like as the first insulating film 113 described above, as the second insulating film 115, a silicon nitride film may be formed by CVD. The silicon nitride film may be used because of a light-transmissiveness, a good coverage and a high dielectric strength voltage thereof.

Next, as shown in FIG. 6(c), the counter substrate 109 is joined to the substrate 101 via a sealing material 108. The counter substrate 109 may be formed of, for example, a glass substrate and a reflective film formed on the glass substrate. The reflective film may be formed on a surface of the glass substrate facing the substrate 101, such that a reflectance of a surface thereof in contact with the glass substrate is high and a reflectance of a surface thereof facing the substrate 101 is low. Although not shown, the reflective film has a light-transmissive section for transmitting light provided from the backlight unit provided behind the counter substrate 109 (on the side of a lower surface of the counter substrate 109 where a surface of the counter substrate 109 facing the substrate 101 is defined as an upper surface). The light-transmissive section may be an opening formed in the reflective film. The light from the backlight unit is transmitted through the glass substrate of the counter substrate 109 and through the light-transmissive section formed in the reflective film, and then reaches the MEMS shutter 202 formed on the substrate 101. The substrate 101 and the counter substrate 109 are joined together such that openings 212 and 214 overlap the light-transmissive section of the counter substrate 109 in a planar direction. Owing to this, the amount of light to be transmitted through the openings 212 and 214 can be controlled by the operation of the MEMS shutter 202. As described above, the reflective film of the counter substrate 109 has a high reflectance at the surface thereof in contact with the glass substrate, and thus can reflect the light from the backlight unit to increase the amount of light. The reflective film of the counter substrate 109 has a low reflectance at the surface thereof facing the substrate 101, and thus can suppress unnecessary light reflectance.

After the substrate 101 and the counter substrate 109 are joined together by the sealing material 108, a damping material may be put into, and sealed in, a space between the substrate 101 and the counter substrate 109. The damping material may be, for example, silicon oil. The viscosity of the damping material and the conditions for putting and sealing the damping material in the space may be selected such that the operation of the MEMS shutter 202 is not hampered and is not, for example, corroded. Owing to this, the MEMS shutter 202 can be suppressed from excessively vibrating due to an external impact, and thus sticking, by which a part of the MEMS shutter 202 contacts other parts of the display device and cannot be detached therefrom, can be suppressed.

Next, as shown in FIG. 6(d) and FIG. 7(b), the second insulating film 115 is removed from a top surface of the terminal 102 by etching to form the terminal opening 102k for exposing the terminal 102. Owing to the terminal opening 102k, the terminal 102 is electrically connected to an external terminal (not shown) and can be supplied with electric power or signals from an external circuit (not shown). As an etching method, dry etching by a RIE method using, for example, a mixed gas of fluorine-containing gas such as $CF_4$ gas, $SF_6$ gas or the like and $O_2$ gas may be applied, like for the first insulating film 113 described above.

However, removal of the second insulating film 115 has the following problem. In the case where the first insulating film 113 provided for covering the terminal 102 and the second insulating film 115 are both a silicon nitride film, the etching rate is the same for the first insulating film 113 and the second insulating film 115. Therefore, it is difficult to remove only the second insulating film 115 and leave the first insulating film 113 having a sufficient thickness for protecting the substrate 101. As shown in FIG. 6(d) and FIG. 7(b), the first insulating film 113 may be removed by an amount more than necessary. As a result, lines formed on the substrate 101 as the TFT substrate may be exposed, which may undesirably cause insulation failure or continuity failure.

In this situation, the present inventor conducted studies to provide a display device which suppresses the thickness reduction of the surface-protecting film on the TFT substrate in the terminal section of the display device and thus improves the reliability of the TFT substrate, and arrived at a display device in an embodiment according to the present invention described below.

Embodiment 1

Hereinafter, with reference to FIG. 8 through FIG. 10, production steps of a terminal section of a display device in Embodiment 1 according to the present invention will be described.

Figure 8:
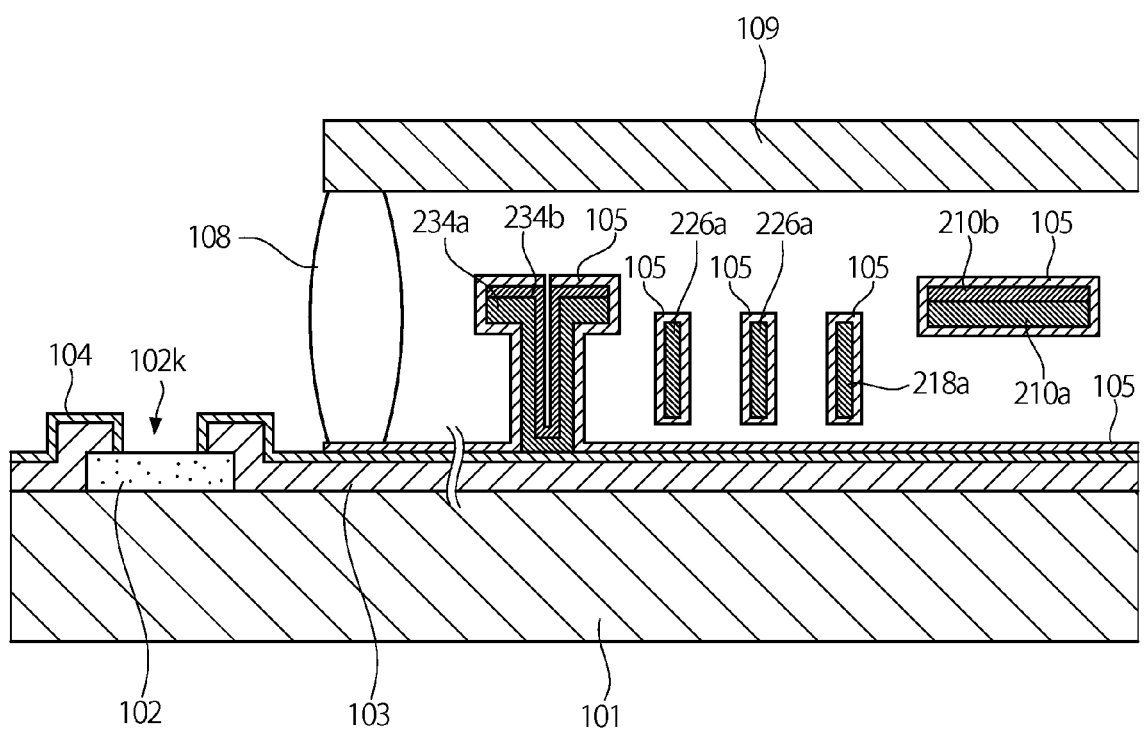
FIG. 8 is a cross-sectional view showing a display section and a terminal section of a display device in Embodiment 1 according to the present invention.
Figure 9:
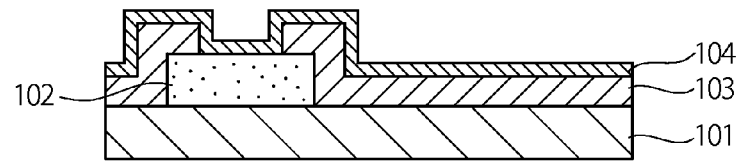
FIG. 9 shows production steps of the terminal section of the display device in Embodiment 1 according to the present invention.
Figure 9:
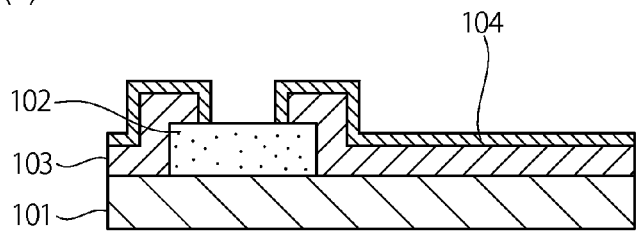
Figure 9:
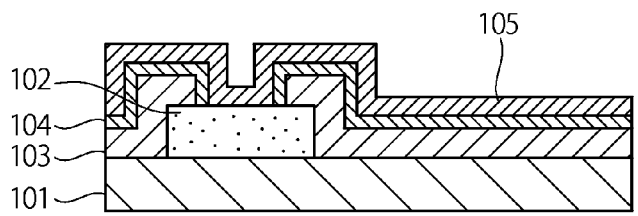
Figure 9:
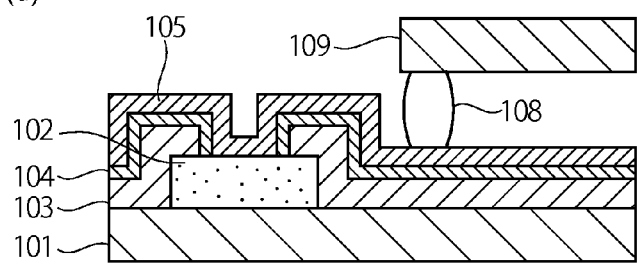
Figure 9:
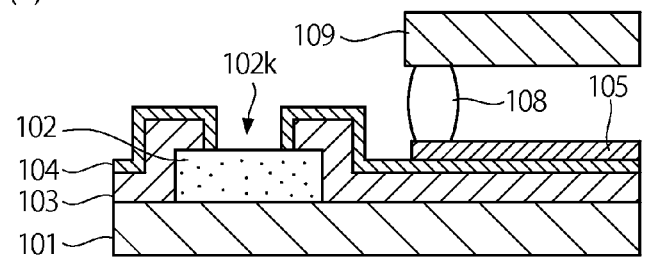

FIG. 8 is a cross-sectional view showing a display section 101a and a terminal section 101e of the display device 100 in Embodiment 1 according to the present invention. FIG. 9 shows production steps of the terminal section 101e of the display device 100 in Embodiment 1 according to the present invention. FIG. 9(a) is a cross-sectional view showing a step of forming a first insulating film 103 and a second insulating film 104, FIG. 9(b) is a cross-sectional view showing a step of forming a part corresponding to an opening on the terminal 102, FIG. 9(c) is a cross-sectional view showing a step of forming a third insulating film 105, FIG. 9(d) is a cross-sectional view showing a step of joining the counter substrate 109 to the substrate 101, and FIG. 9(e) is a cross-sectional view showing a step of forming the opening on the terminal 102. FIG. 10 is a cross-sectional view showing a step of forming the third insulating film 105 among the production steps of the display section 101a and the terminal section 101e of the display device 100 in Embodiment 1 according to the present invention.

As shown in FIG. 8, in the display section 101a of the display device 100 in Embodiment 1 according to the present invention, the second insulating film 104 is provided on the first insulating film 103 provided on the substrate 101 as the TFT substrate, and the MEMS shutter 202 is provided on the second insulating film 104. The MEMS shutter 202 includes the shutter 210, the first spring 218, the second spring 226, and the anchor section 234. On the substrate 101 having the second insulating film 104 formed thereon and also on side surfaces of the MEMS shutter 202, the third insulating film 105 is provided. To the display section 101a, the counter substrate 109 is joined via a sealing material 108. In the terminal section 101e, the first insulating film 103 is provided on the terminal 102 provided on the substrate 101, and the second insulating film 104 is provided on the first insulating film 103. A part of the terminal 102 is exposed by the terminal opening 102k formed in the first insulating film 103 and the second insulating film 104. Owing to the terminal opening 102k, the terminal 102 can be connected to an external terminal (not shown), and therefore can be supplied with electric power or signals from an external circuit (not shown).

Hereinafter, with reference to FIG. 9 and FIG. 10, production steps of the terminal section 101e and the display section 101a of the display device 100 according to the present invention will be described.

As shown in FIG. 9(a), on the substrate 101 having the terminal 102 formed thereon, the first insulating film 103 is formed, and a part of the first insulating film 103 corresponding to a part in which the terminal opening 102k is to be formed is removed by etching (etched away). Then, the second insulating film 104 is formed. The first insulating film 103 is an insulating film for protecting the surface of the substrate 101 as the TFT substrate. Like as the first insulating film 113 described above, as the first insulating film 103, a silicon nitride film may be formed by CVD as described above. The silicon nitride film may be used because of a light-transmissiveness, a good coverage and a high dielectric strength voltage thereof. By use of CVD, the first insulating film 103 formed of a silicon nitride film can be formed on the substrate 101 at a temperature of about 200° C. Owing to this, the first insulating film 103 can be formed on the substrate 101 having the terminal 102 formed thereon without spoiling the reliability of the substrate 101 as the TFT substrate. After the first insulating film 103 is formed, a part of the first insulating film 103 corresponding to the part in which the terminal opening 102k is to be formed is removed by etching. As an etching method in the case where the first insulating film 103 is a silicon nitride film, dry etching by a RIE method using, for example, a mixed gas of fluorine-containing gas such as $CF_4$ gas, $SF_6$ gas or the like and $O_2$ gas may be applied.

After the part of the first insulating film 103 corresponding to the part in which the terminal opening 102k is to be formed is removed by etching, the second insulating film 104 is formed on the first insulating film 103. There is no specific limitation on the material of the second insulating film 104, and any material having a desired selection ratio with respect to the first insulating film 103 in an etching step described later is usable. For example, in the case where a silicon nitride film is used for the first insulating film 103, a silicon oxide (SiO) film having a different etching rate from that of the silicon nitride film may be used for the second insulating film 104. In the case where a silicon oxide film is used for the second insulating film 104, the second insulating film 104 may be formed by CVD or the like. The second insulating film 104 may be a silicon oxynitride (SiON) film or a resin film as long as such a film has a desired selection ratio with respect to the first insulating film 103, which is, for example, a silicon nitride film. The selection ratio of the first insulating film 103 and the second insulating film 104 is desirably the second insulating film 104/the first insulating film 103=about 5 to 10. Alternatively, the second insulating film 104 may be made thicker than the insulating film 103 so that etching conditions for the first insulating film 103 are made different from those for the second insulating film 104. Owing to this, in an etching step described later, the terminal opening 102k for exposing the terminal 102 can be formed while the first insulating film 103 is left having a sufficient thickness.

Next, as shown in FIG. 9(b), a part of the second insulating film 104 corresponding to a part in which the terminal opening 102k is to be formed is removed by etching to expose the terminal 102. As an etching method, wet etching using an etchant suitable for the material of the second insulating film 104 or dry etching using etching gas suitable for the material of the second insulating film 104 may be used. In the case where the second insulating film 104 is formed of a silicon oxide film, wet etching using a dilute aqueous solution of HF or an aqueous solution of $NH_4F$ as an etching solution may be used. Alternatively, dry etching by a RIE method using, for example, a mixed gas of fluorine-containing gas such as $CF_4$ gas, $SF_6$ gas or the like and $O_2$ gas may be applied.

Figure 10:
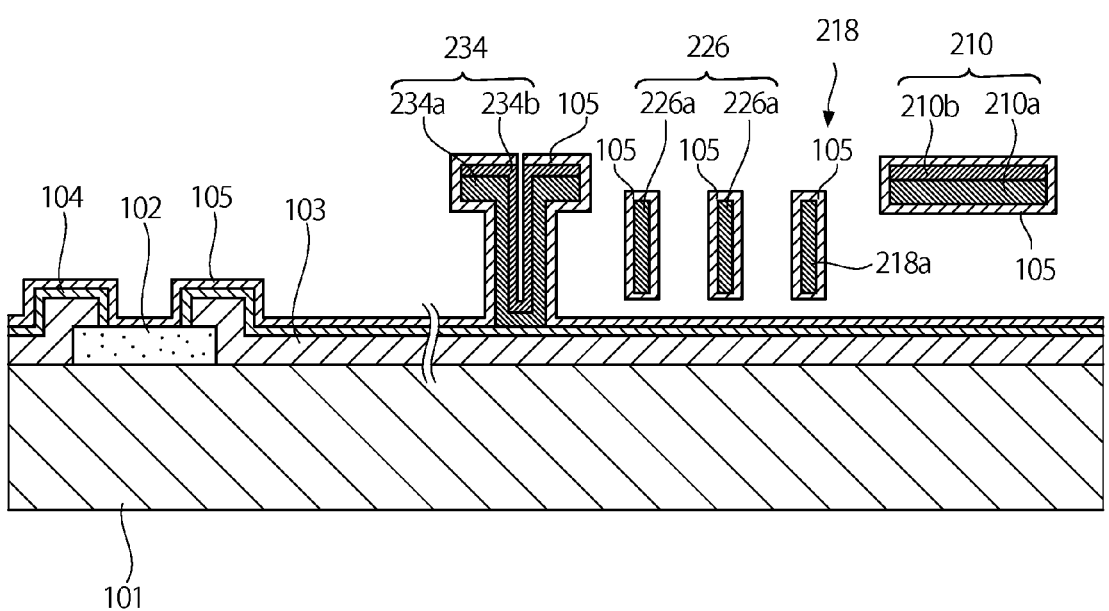
FIG. 10 is a cross-sectional view showing a step of forming the third insulating film among the production steps of the display section and the terminal section of the display device in Embodiment 1 according to the present invention.

Next, as shown in FIG. 9(c) and FIG. 10, the third insulating film 105 is formed on the second insulating film 104. Like the second insulating film 115 described above with reference to FIG. 7(a), the third insulating film 105 is formed to cover the side surfaces and the bottom surfaces of the shutter 210, the first spring 218, the second spring 226 and the anchor section 234. Owing to this, the shutter 210, the first spring 218 and the second spring 226 each having the a-Si layer are prevented from undetachably contacting other parts of the display device or from causing shortcircuiting, even if being displaced during the operation of the MEMS shutter 202. Like as the first insulating film 103, as the third insulating film 105, a silicon nitride film may be formed by CVD. The silicon nitride film may be used because of a good coverage and a high dielectric strength voltage thereof. By forming a silicon nitride film by CVD, the third insulating film 105 can be formed at a temperature of about 200° C. on the substrate 101 and also on the side surfaces and the bottom surfaces of the shutter 210, the first spring 218 and the second spring 226, which are formed out of contact with the substrate 101. There is no specific limitation on the structure or the material of the third insulating film 105 as long as the third insulating film 105 is formed of a material having a desired selection ratio with respect to the second insulating film 104 in an etching step described later and has a structure for preventing shortcircuiting and allowing the MEMS shutter 202 to be electrostatically driven properly. The selection ratio of the second insulating film 104 and the third insulating film 105 is preferably the third insulating film 105/the second insulating film 104=about 10 to 20.

Next, as shown in FIG. 9(d), the counter substrate 109 is joined to the substrate 101 via the sealing material 108. Then, as shown in FIG. 9(e), the third insulating film 105 is removed by etching to form the terminal opening 102k for exposing the terminal 102. As an etching method, wet etching using an etchant suitable for the material of the third insulating film 105 or dry etching using etching gas suitable for the material of the third insulating film 105 may be used. In the case where the second insulating film 104 is a silicon oxide film and the third insulating film 105 is a silicon nitride film, dry etching by a RIE method using, for example, a mixed gas of fluorine-containing gas such as $CF_4$ gas, $SF_6$ gas or the like and $O_2$ gas may be applied. In the case where wet etching is used, a phosphoric acid solution or the like may be used. As the sealing material 108, a material which is not etched by such an etchant or etching gas is used. As described above, the second insulating film 104 has a different etching rate from that of the third insulating film 105 and from that of the first insulating film 103. Therefore, as shown in FIG. 9(e), the second insulating film 104 can be used as an etching stopper, and thus the etching on the third insulating film 105 can be terminated without etching the first insulating film 103.

Thus, according to Embodiment 1 of the present invention, in the step of exposing the terminal 102 in the terminal section 101e to form the terminal opening 102k, the third insulating film 105 covering the terminal 102 can be removed without exposing the TFTs, lines or the like formed on the substrate 101. Therefore, insulation failure or continuity failure of lines or the like can be prevented, and the reliability of the TFT substrate can be maintained.

As can be seen, according to the present invention, a display device and a method for producing the same for removing an insulating film from top of terminals while suppressing the thickness reduction of an insulating film provided for protecting a surface of a TFT substrate and thus improving the reliability of the TFT substrate can be provided.

Although not shown, in the case where the etching can be performed so as to leave the first insulating film 103 having a sufficient thickness, the second insulating film 104 may be removed by etching as well as the third insulating film 105.

Embodiment 2

Hereinafter, with reference to FIG. 11, production steps of the terminal section 101e of the display device 100 in Embodiment 2 according to the present invention will be described. Steps substantially the same as those of the production steps of the terminal section 101e of the display device 100 in Embodiment 1 described above will not be described in repetition.

Figure 11:
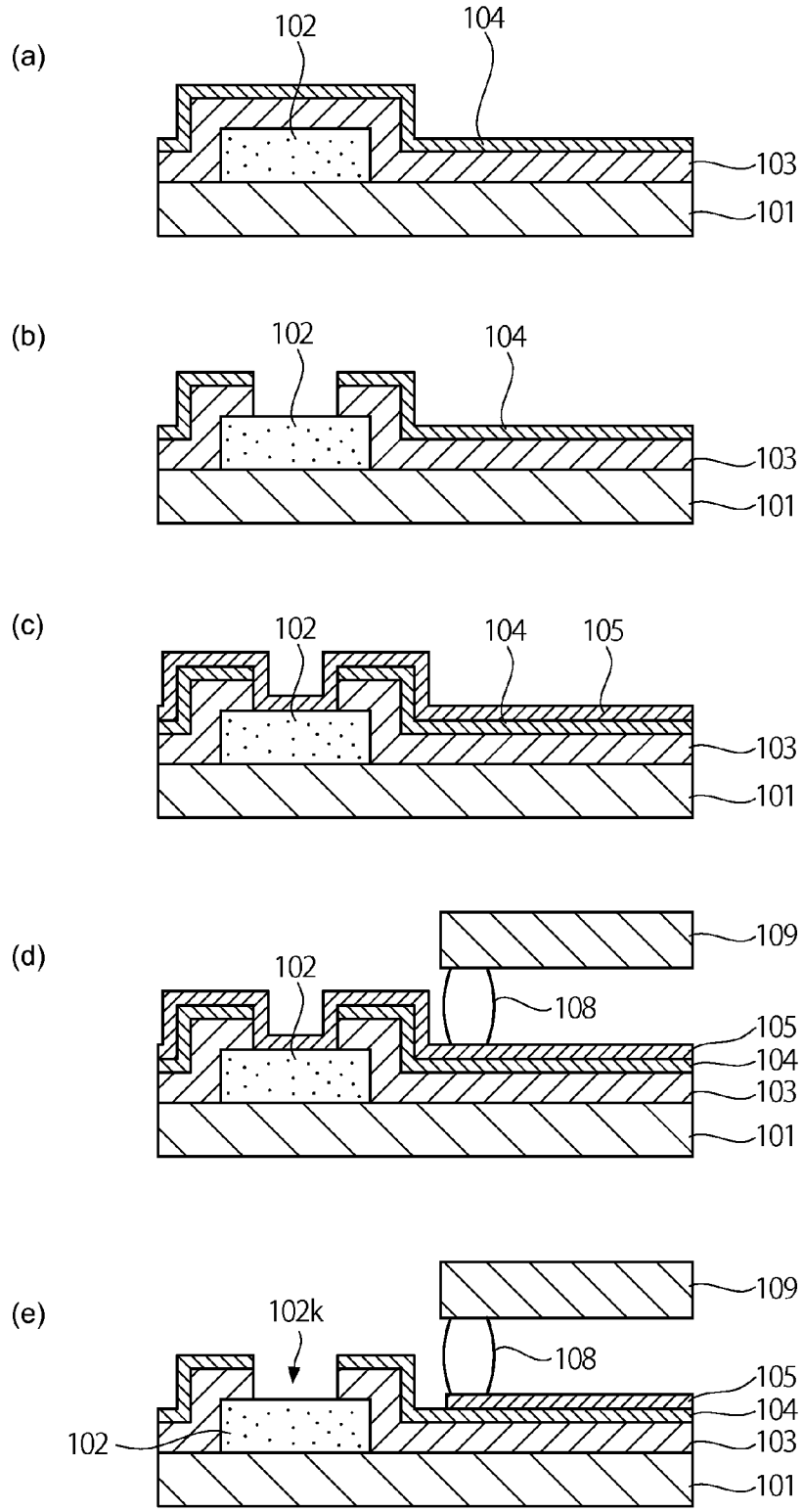
FIG. 11 shows production steps of a display device in Embodiment 2 according to the present invention.

FIG. 11 shows production steps of the terminal section 101e of the display device 100 in Embodiment 2 according to the present invention. FIG. 11(a) is a cross-sectional view showing a step of forming a first insulating film 103 and a second insulating film 104, FIG. 11(b) is a cross-sectional view showing a step of forming a part corresponding to the opening on the terminal 102, FIG. 11(c) is a cross-sectional view showing a step of forming a third insulating film 105, FIG. 11(d) is a cross-sectional view showing a step of joining the counter substrate 109 to the substrate 101, and FIG. 11(e) is a cross-sectional view showing a step of forming the opening on the terminal 102.

As shown in FIG. 11(a), on the substrate 101 having the terminal 102 formed thereon, the first insulating film 103 and the second insulating film 104 are formed. Unlike in Embodiment 1 described above, the second insulating film 104 is formed on the first insulating film 103 without etching the first insulating film 103. The first insulating film 103 and the second insulating film 104 are formed of materials having different etching rates. The first insulating film 103 and the second insulating film 104 may be formed of substantially the same materials by substantially the same methods as those of the first insulating film 103 and the second insulation film 104 in Embodiment 1 described above.

Next, as shown in FIG. 11(b), a part of the first insulating film 103 and a part of the second insulating film 104 corresponding to a part in which the terminal opening 102k is to be formed are removed by etching to expose the terminal 102. As an etching method, dry etching by a RIE method using, for example, a mixed gas of fluorine-containing gas such as $CF_4$ gas, $SF_6$ gas or the like and $O_2$ gas may be applied.

Next, as shown in FIG. 11(c), the third insulating film 105 is formed on the second insulating film 104. The second insulating film 104 and the third insulating film 105 are formed of materials having different etching rates. The third insulating film 105 may be formed of substantially the same material by substantially the same method as those of the third insulating film 105 in Embodiment 1 described above.

Next, as shown in FIG. 11(d), the counter substrate 109 is joined to the substrate 101 via the sealing material 108. Then, as shown in FIG. 11(e), the third insulating film 105 is removed by etching to form the terminal opening 102k for exposing the terminal 102. As an etching method, wet etching using an etchant suitable for the material of the third insulating film 105 or dry etching using etching gas suitable for the material of the third insulating film 105 may be used, like in Embodiment 1 described above. The second insulating film 104 has a different etching rate from that of the third insulating film 105 and from that of the first insulating film 103. Therefore, the second insulating film 104 can be used as an etching stopper, and thus the etching on the third insulating film 105 can be terminated without etching the first insulating film 103.

Thus, according to Embodiment 2 of the present invention, in the step of exposing the terminal 102 in the terminal section 101e to form the terminal opening 102k, the third insulating film 105 covering the terminal 102 can be removed without exposing the TFTs, lines or the like formed on the substrate 101. Therefore, like in Embodiment 1 described above, insulation failure or continuity failure of lines or the like can be prevented, and the reliability of the TFT substrate can be maintained.

Embodiment 3

Hereinafter, with reference to FIG. 12, production steps of the terminal section 101e of the display device 100 in Embodiment 3 according to the present invention will be described. Steps substantially the same as those of the production steps of the terminal section 101e of the display device 100 in Embodiment 1 described above will not be described in repetition.

Figure 12:
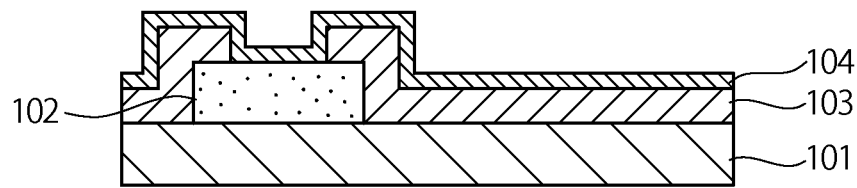
FIG. 12 shows production steps of a display device in Embodiment 3 according to the present invention.
Figure 12:
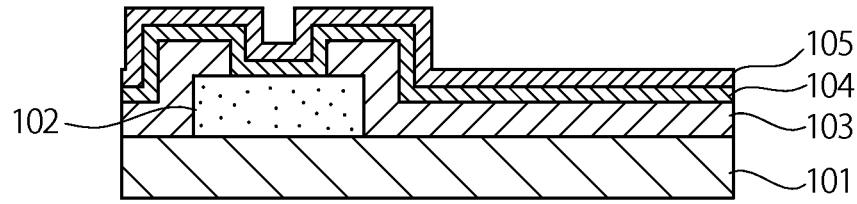
Figure 12:
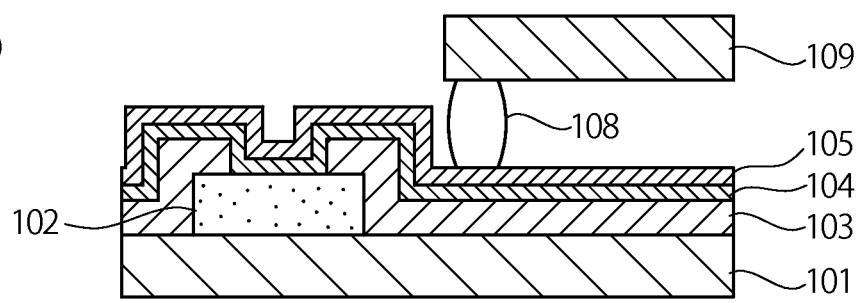
Figure 12:
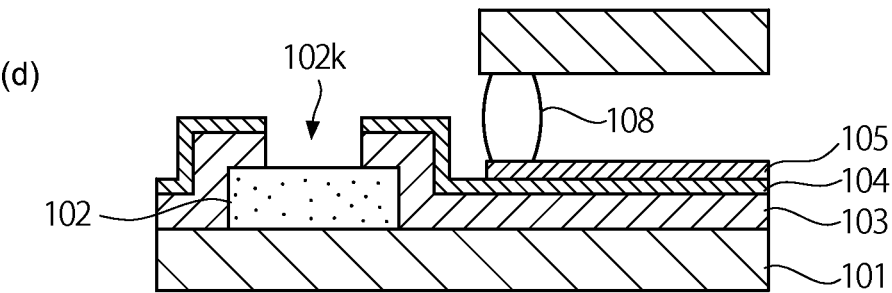

FIG. 12 shows production steps of the terminal section 101e of the display device 100 in Embodiment 3 according to the present invention. FIG. 12(a) is a cross-sectional view showing a step of forming a first insulating film 103 and a second insulating film 104, FIG. 12(b) is a cross-sectional view showing a step of forming a third insulating film 105, FIG. 12(c) is a cross-sectional view showing a step of joining the counter substrate 109 to the substrate 101, and FIG. 12(d) is a cross-sectional view showing a step of forming the opening on the terminal 102.

As shown in FIG. 12(a), on the substrate 101 having the terminal 102 formed thereon, the first insulating film 103 is formed, and then and the second insulating film 104 is formed. Like in Embodiment 1 described above, a part of the first insulating film 103 corresponding to a part in which the terminal opening 102k is to be formed is removed by etching. After the part of the first insulating film 103 corresponding to the part in which the terminal opening 102k is to be formed is removed, the second insulating film 104 is formed on the first insulating film 103. Like in Embodiment 1 described above, the first insulating film 103 and the second insulating film 104 are formed of materials having different etching rates. The first insulating film 103 and the second insulating film 104 may be formed of substantially the same materials by substantially the same methods as those in Embodiment 1 described above.

Next, as shown in FIG. 12(b), the third insulating film 105 is formed on the second insulating film 104. The second insulating film 104 and the third insulating film 105 are formed of materials having different etching rates. The third insulating film 105 may be formed of substantially the same material by substantially the same method as those of the third insulating film 105 in Embodiment 1 described above.

Next, as shown in FIG. 12(c), the counter substrate 109 is joined to the substrate 101 via the sealing material 108. Then, as shown in FIG. 12(d), the second insulating film 104 and the third insulating film 105 are removed by etching to form the terminal opening 102k for exposing the terminal 102. As an etching method, wet etching using an etchant suitable for the material of the third insulating film 105 or dry etching using etching gas suitable for the material of the third insulating film 105 may be used, like in Embodiment 1 described above. The second insulating film 104 has a different etching rate from that of the third insulating film 105 and from that of the first insulating film 103. Therefore, the second insulating film 104 can be used as an etching stopper, and thus the etching on the third insulating film 105 can be terminated without etching the first insulating film 103.

Thus, according to Embodiment 3 of the present invention, in the step of exposing the terminal 102 in the terminal section 101e to form the terminal opening 102k, the second insulating film 104 and the third insulating film 105 covering the terminal 102 can be removed without exposing the TFTs, lines or the like formed on the substrate 101. Therefore, like in Embodiments 1 and 2 described above, insulation failure or continuity failure of lines or the like can be prevented, and the reliability of the TFT substrate can be maintained.

Embodiment 4

Hereinafter, with reference to FIG. 13, production steps of the terminal section 101e of the display device 100 in Embodiment 4 according to the present invention will be described. Steps substantially the same as those of the production steps of the terminal section 101e of the display device 100 in Embodiment 1 described above will not be described in repetition.

Figure 13:
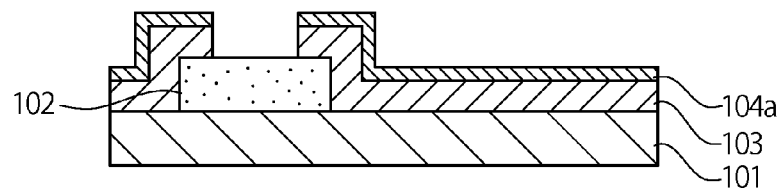
FIG. 13 shows production steps of a display device in Embodiment 4 according to the present invention.
Figure 13:
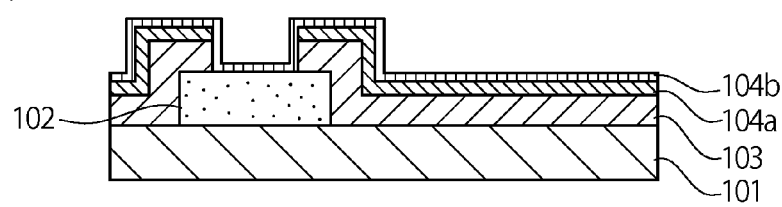
Figure 13:
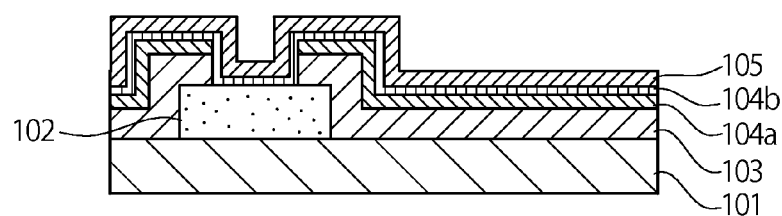
Figure 13:
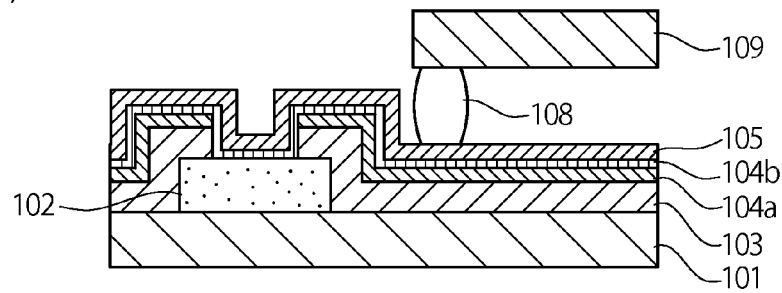
Figure 13:
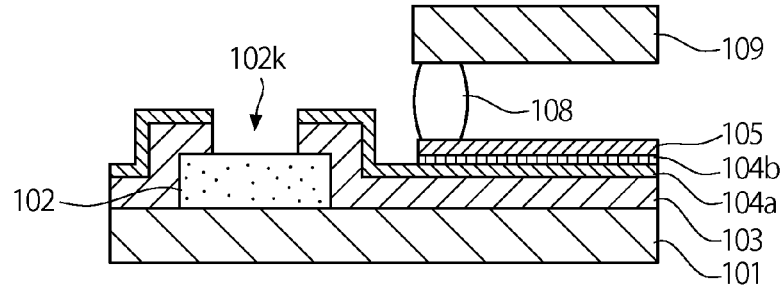

FIG. 13 shows production steps of the terminal section 101e of the display device 100 in Embodiment 4 according to the present invention. FIG. 13(a) is a cross-sectional view showing a step of forming a first insulating film 103 and a lower-layer second insulating film 104a, FIG. 13(b) is a cross-sectional view showing a step of forming an upper-layer second insulating film 104b, FIG. 13(c) is a cross-sectional view showing a step of forming a third insulating film 105, FIG. 13(d) is a cross-sectional view showing a step of joining the counter substrate 109 to the substrate 101, and FIG. 11(e) is a cross-sectional view showing a step of forming the opening on the terminal 102.

In this embodiment, in order to indicate that the second insulating film 104 has a two-layer structure unlike the second insulating film 104 in Embodiments 1 through 3 described above, the lower-layer second insulating film is represented with reference numeral 104a and the upper-layer second insulating film is represented with reference numeral 104b for the convenience of description. The order of the lower-layer second insulating film 104a and the upper-layer second insulating film 104b is not limited to this, and the lower-layer second insulating film 104a and the upper-layer second insulating film 104b may be provided in an opposite order. The second insulating film 104 may include two or more layers.

As shown in FIG. 13(a), on the substrate 101 having the terminal 102 formed thereon, the first insulating film 103 is formed, and thus the lower-layer second insulating film 104a is formed. A part of the first insulating film 103 and a part of the lower-layer second insulating film 104a corresponding to a part in which the terminal opening 102k is to be formed are removed by etching. The formation of the first insulating film 103 and the lower-layer second insulating film 104a can be performed in substantially the same manner as that of the production steps in Embodiment 2 described above with reference to FIGS. 11(a) and (b), and thus will not be described in detail. The first insulating film 103 and the lower-layer second insulating film 104a are formed of materials having different etching rates, like the first insulating film 103 and the second insulating film 104 in Embodiment 1 described above. The first insulating film 103 and the lower-layer second insulating film 104a may be formed of substantially the same materials by substantially the same methods as those the first insulating film 103 and the second insulating film 104 in Embodiment 1 described above.

Next, as shown in FIG. 13(b), the upper-layer second insulating film 104b is formed on the lower-layer second insulating film 104a. Like the lower-layer second insulating film 104a, the upper-layer second insulating film 104b may be formed of substantially the same material by substantially the same method as those the second insulating film 104 in Embodiment 1 described above. Therefore, in the case where the lower-layer second insulating film 104a is, for example, a silicon oxide film, the upper-layer second insulating film 104b may also be a silicon oxide film or may be a silicon oxynitride film.

Next, as shown in FIG. 13(c), the third insulating film 105 is formed on the upper-layer second insulating film 104b. The upper-layer second insulating film 104b and the third insulating film 105 are formed of materials having different etching rates. The third insulating film 105 may be formed of substantially the same material by substantially the same method as those of the third insulating film 105 in Embodiment 1 described above.

Next, as shown in FIG. 13(d), the counter substrate 109 is joined to the substrate 101 via the sealing material 108. Then, as shown in FIG. 13(e), the upper-layer second insulating film 104b and the third insulating film 105 are removed by etching to form the terminal opening 102k for exposing the terminal 102. As an etching method, wet etching using an etchant suitable for the material of the third insulating film 105 or dry etching using etching gas suitable for the material of the third insulating film 105 may be used, like in Embodiment 1 described above. The second insulating film 104 has a different etching rate from that of the third insulating film 105 and from that of the first insulating film 103. Therefore, the second insulating film 104 can be used as an etching stopper, and thus the etching on the third insulating film 105 can be terminated without etching the first insulating film 103.

Thus, according to Embodiment 4 of the present invention, in the step of exposing the terminal 102 in the terminal section 101e to form the terminal opening 102k, the lower-layer second insulating film 104a and the third insulating film 105 covering the terminal 102 can be removed without exposing the TFTs, lines or the like formed on the substrate 101. Therefore, like in Embodiments 1 through 3 described above, insulation failure or continuity failure of lines or the like can be prevented, and the reliability of the TFT substrate can be maintained.

Embodiment 5

In Embodiments 1 through 4 described above, the second insulating film 104 (including the lower-layer second insulating film 104a) is formed to extend from the vicinity of the terminal 102 into the display section 101a. Alternatively, the second insulating film 104 may not be formed in an area on the side of the display section 101a from the sealing material 108. The method for producing the display device 100 may include a step of removing the second insulating film 104 from the area on the side of the display section 101a from the sealing material 108. Even with such a structure, the insulating film on the terminal can be removed while the thickness reduction of the insulating film provided for protecting the surface of the TFT substrate is suppressed.

As described above, according to Embodiments 1 through 5 of the present invention, the insulating film on the terminal can be removed while the thickness reduction of the insulating film provided for protecting the surface of the TFT substrate is suppressed. Therefore, according to a display device and a method for producing the same of the present invention, the yield of the TFT substrate can be raised and the reliability thereof can be improved.

What is claimed is:

1. A display device, comprising:
   a plurality of pixels respectively provided in correspondence with intersections of a plurality of data lines and a plurality of gate lines provided on a substrate;
   a first insulating film provided on the substrate;
   a second insulating film provided on the first insulating film in contact with at least a part thereof and formed of a different material from that of the first insulating film;
   a plurality of MEMS shutters provided over the second insulating film, respectively in correspondence with the plurality of pixels, the plurality of MEMS shutters having a third insulating film formed on side surfaces thereof; and
   a plurality of terminals for supplying a potential to the plurality of gate lines and the plurality of data lines, the plurality of terminals receiving the potential through openings formed in the first insulating film and the second insulating film, the openings being formed on the plurality of terminals.

2. A display device according to claim 1, wherein the second insulating film has an etching rate different from that of the first insulating film and different from that of the third insulating film.

3. A display device according to claim 1, wherein:
   the MEMS shutters each include a shutter having an opening, a first spring connected to the shutter, a first anchor connected to the first spring, a second spring, and a second anchor connected to the second spring; and
   the first spring and the second spring are electrostatically driven by a potential difference between the first anchor and the second anchor.

4. A display device according to claim 3, wherein:
   the MEMS shutters are each connected to one of a plurality of switching elements respectively provided in correspondence with the MEMS shutters; and
   the potential difference between the first anchor and the second anchor is provided by the switching element.

5. A display device according to claim 1, further comprising:
   a counter substrate joined to the substrate, the counter substrate having light-transmissive sections; and
   a backlight unit provided to face the counter substrate;
   wherein light from the backlight unit is transmitted through the opening of each of the shutters and each of the light-transmissive sections which overlaps the opening.

6. A method for producing a display device, comprising:
   forming a plurality of switching elements and a plurality of terminals on a substrate;
   forming a first insulating film on the plurality of switching elements and the plurality of terminals;
   forming a second insulating film on the first insulating film, the second insulating film being formed of a different material from that of the first insulating film;
   etching away parts of the first insulating film and parts of the second insulating film which are on the plurality of terminals, thereby exposing parts of the plurality of terminals;
   forming a plurality of MEMS shutters over the second insulating film, each of the plurality of MEMS shutters being drivable by a corresponding switching element among the plurality of switching elements and including a shutter having an opening, a first spring connected to the shutter, a first anchor connected to the first spring, a second spring, and a second anchor connected to the second spring;
   forming a third insulating film on the plurality of MEMS shutters and the plurality of terminals; and
   etching away parts of the third insulating film which are on the plurality of terminals, thereby exposing parts of the plurality of terminals.

7. A method for producing a display device, comprising:
   forming a plurality of switching elements and a plurality of terminals on a substrate;
   forming a first insulating film on the plurality of switching elements and the plurality of terminals;
   etching away parts of the first insulating film which are on the plurality of terminals, thereby exposing parts of the plurality of terminals;
   forming a second insulating film on the first insulating film, the second insulating film being formed of a different material from that of the first insulating film;
   forming a plurality of MEMS shutters over the second insulating film, each of the plurality of MEMS shutters being drivable by a corresponding switching element among the plurality of switching elements and including a shutter having an opening, a first spring connected to the shutter, a first anchor connected to the first spring, a second spring, and a second anchor connected to the second spring;
   forming a third insulating film on the plurality of MEMS shutters and the plurality of terminals; and
   etching away parts of the second insulating film and parts of the third insulating film which are on the plurality of terminals, thereby exposing parts of the plurality of terminals.

8. A method for producing a display device according to claim 6, wherein the second insulating film is formed of a material having a different etching rate from that of the first insulating film and different from that of the third insulating film.

9. A method for producing a display device according to claim 6, wherein the second insulating film is formed to have a stacking structure including a plurality of layers.

10. A method for producing a display device according to claim 6, wherein the first insulating film and the third insulating film are formed of silicon nitride by CVD.

11. A method for producing a display device according to claim 6, wherein the counter substrate is joined to the substrate via a sealing material such that the counter substrate faces a surface of the substrate having the plurality of switching elements formed thereon.

* * * * *